US012801224B2

(12) United States Patent
Pollack et al.

(10) Patent No.: US 12,801,224 B2
(45) Date of Patent: Nov. 17, 2026

(54) KEYBOARDS WITH INDIVIDUALLY CUSTOMIZABLE KEYS

(71) Applicant: Lenovo (United States) Inc., Morrisville, NC (US)

(72) Inventors: Daniel Pollack, Cary, NC (US); Jonathan Co Lee, Morrisville, NC (US)

(73) Assignee: LENOVO (UNITED STATES) INC., Morrisville, NC (US)

(*) Notice: Subject to any disclaimer, the term of this patent is extended or adjusted under 35 U.S.C. 154(b) by 0 days.

(21) Appl. No.: 18/922,063

(22) Filed: Oct. 21, 2024

(65) Prior Publication Data

US 2026/0111076 A1 Apr. 23, 2026

(51) Int. Cl.
*G06F 3/02* (2006.01)
*G06F 3/01* (2006.01)

(52) U.S. Cl.
CPC ............ *G06F 3/0219* (2013.01); *G06F 3/016* (2013.01); *G06F 3/02* (2013.01); *G06F 3/0208* (2013.01); *G06F 3/0224* (2013.01)

(58) Field of Classification Search
CPC .......... G06F 3/0219; G06F 3/016; G06F 3/02; G06F 3/0208; G06F 3/0224
See application file for complete search history.

(56) References Cited

U.S. PATENT DOCUMENTS

| | | | | |
|---|---|---|---|---|
| 2011/0111375 A1* | 5/2011 | Luu | G09B 21/004 434/114 |
| 2011/0234502 A1* | 9/2011 | Yun | G09B 21/003 345/173 |
| 2018/0366030 A1* | 12/2018 | Abebe | G06F 3/0219 |
| 2019/0355276 A1* | 11/2019 | Rami | G09B 21/009 |

* cited by examiner

*Primary Examiner* — Adam R. Giesy
(74) *Attorney, Agent, or Firm* — Carroll, Hoette & Butscher, LLC; Christopher R. Carroll

(57) ABSTRACT

A key configured to be included in a keyboard is provided. The key includes a body having an upper surface that is contacted to provide input to a computer. The upper surface of the body has one or more openings. The key also includes one or more pins positioned in the body and aligned with the one or more openings, and one or more actuators coupled with the one or more pins. The one or more actuators configured to move the one or more pins to move through the one or more openings and project out from the upper surface of the body.

20 Claims, 4 Drawing Sheets

KEYBOARDS WITH INDIVIDUALLY CUSTOMIZABLE KEYS

FIELD

Embodiments of the subject matter described herein relate to input devices such as keyboards.

BACKGROUND

Various input devices are used to provide information into computerized systems, such as keyboards. Some computers with keyboards can provide audible feedback to indicate which keys are pressed, and some keyboards have bumps or raised portions on certain keys (i.e., the f and j keys) to help people locate keys by touch. This can be helpful to persons with visual impairments and/or persons learning to type without looking at the keyboard. But people having impairments from an early age may struggle with learning locations of keys on a keyboard.

Some known physical or tactile feedback provide limited solutions and may not be designed with disabilities in mind. Some keyboard covers can be placed over the keys of the keyboard to provide tactile feedback to users, but these covers cannot fit onto all different keyboard layouts. Some computers can provide auditory feedback when keys are pressed, but this may be cumbersome or undesirable in public spaces. A need may exist for improved keyboards.

BRIEF DESCRIPTION

In one example, a key configured to be included in a keyboard is provided. The key includes a body having an upper surface that is contacted to provide input to a computer. The upper surface of the body has one or more openings. The key also includes one or more pins positioned in the body and aligned with the one or more openings, and one or more actuators coupled with the one or more pins. The one or more actuators configured to move the one or more pins to move through the one or more openings and project out from the upper surface of the body.

In one example, a method includes forming a body of a key of a keyboard. The body can be formed to have an upper surface that is contacted to provide input to a computer. The upper surface of the body can be formed to include one or more openings. The method also can include placing one or more pins in the body and aligned with the one or more openings, and coupling one or more actuators with the one or more pins. The one or more actuators can move the one or more pins to move through the one or more openings and project out from the upper surface of the body.

In another example, a computer can include a keyboard having plural keys configured to be pressed to provide input, and a control unit configured to receive the input from pressing of the keys in the keyboard. The one or more of the keys in the keyboard have an upper surface with one or more holes through the upper surface and one or more pins located inside the one or more of the keys. The one or more of the keys can include one or more actuators coupled with the one or more pins. The control unit can control the one or more actuators to raise the one or more pins out of the one or more openings and project upward and outward from the upper surface of the one or more keys.

BRIEF DESCRIPTION OF THE DRAWINGS

The subject matter described herein will be better understood from reading the following description of non-limiting embodiments, with reference to the attached drawings, wherein below.

DETAILED DESCRIPTION

Examples of the inventive subject matter described herein relate to keyboards and computers having keyboards with individually actuatable pins. Keys of the keyboards can have pins embedded on or inside the keys (e.g., underneath upper surfaces of the keys). These pins can be individually controlled to (a) raise above the upper surfaces of the keys or (b) lower to or below the upper surfaces to customize tactile feedback (e.g., the feel) of each key. For example, different sets or combinations of the pins can be raised or lowered in different keys to represent which letter, symbol, number, or punctuation will be input into the computer when different keys are pressed. The keys (or at least the upper surfaces of the keys) may be porous with openings aligned with different pins. The pins may be controlled (e.g., raised or lowered) using actuators such as springs, solenoids, magnets, or the like.

Control of these pins can be used to create braille patterns to indicate which letter, symbol, number, or punctuation is associated with different keys. Optionally, the pins can be controlled to create customized patterns for different keys, such as for user preferences, for setting macro keys (e.g., keys that, when pressed, cause the computer to perform a programmed series of tasks), etc. As another example, the pins may raise (or lower) to train users to type (e.g., to indicate which key should be pressed next when typing a word or number and/or to vibrate when the incorrect key is pressed), to allow users to customize the feel of different keys, to allow the computers to help fix commonly misspelled words or prevent misspelling of the words (e.g., customized to the user, which may involve using artificial intelligence or machine learning), or the like.

Figure 1:
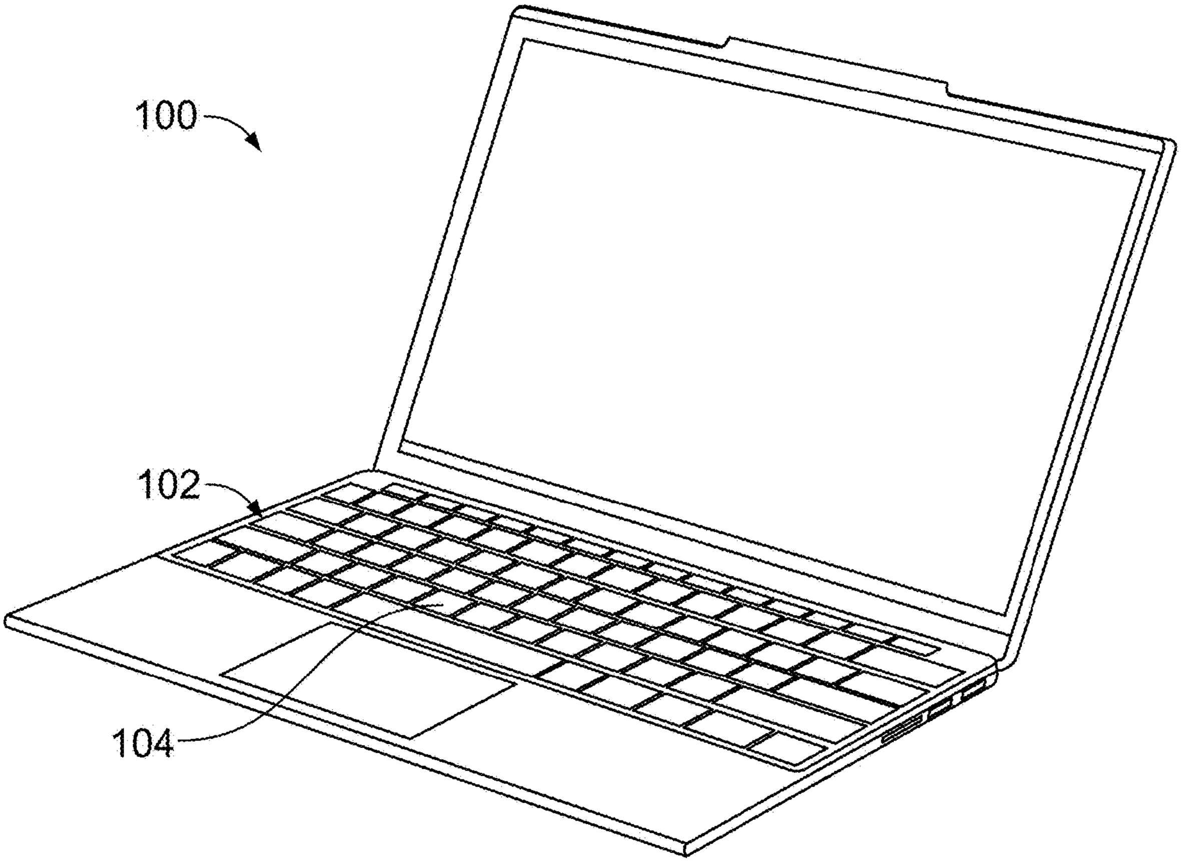
FIG. 1 illustrates one example of a computer with a customizable keyboard.
Figure 2:
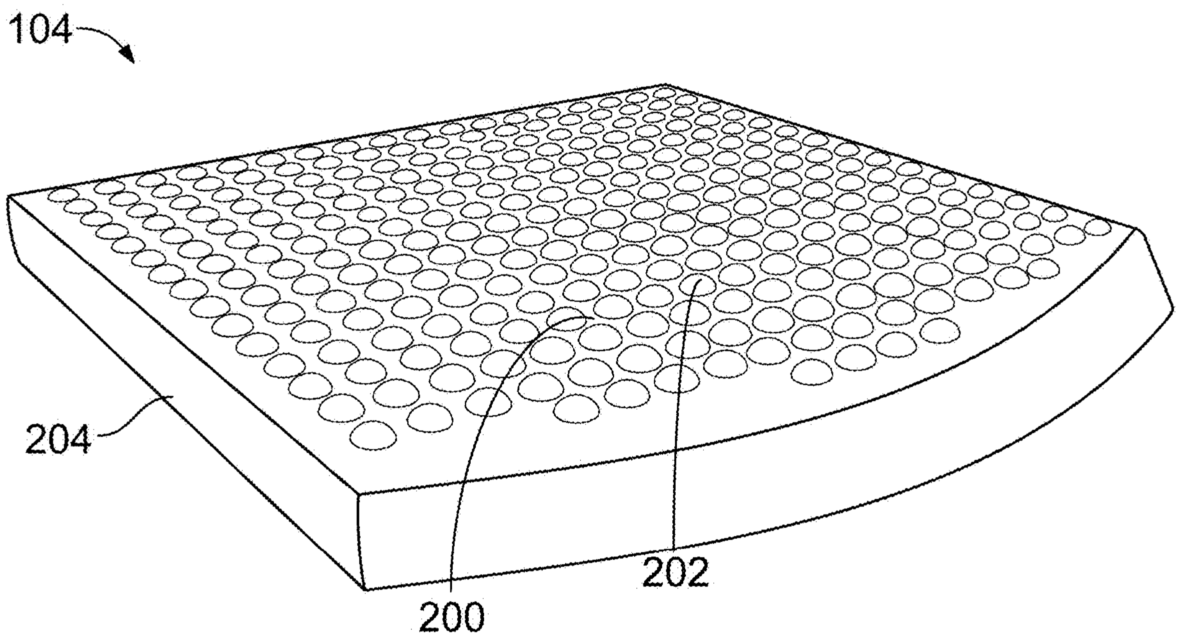
FIG. 2 illustrates an example of a key of the keyboard shown in FIG. 1.
Figure 3:
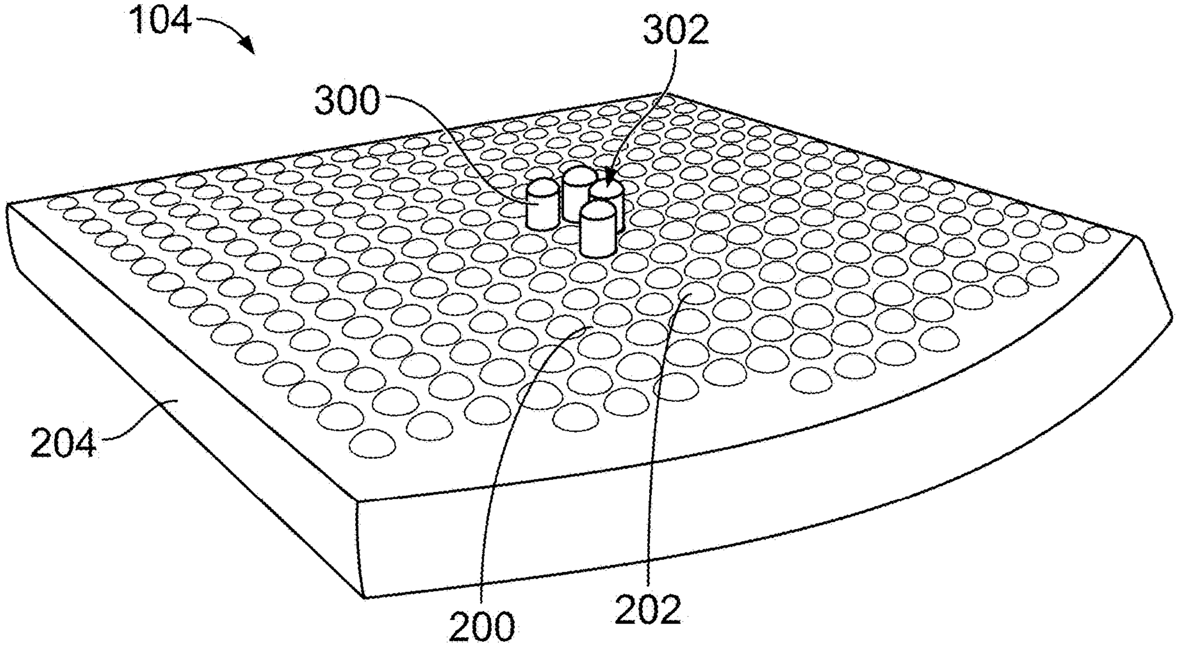
FIG. 3 illustrates another example of the key shown in FIG. 2.
Figure 4:
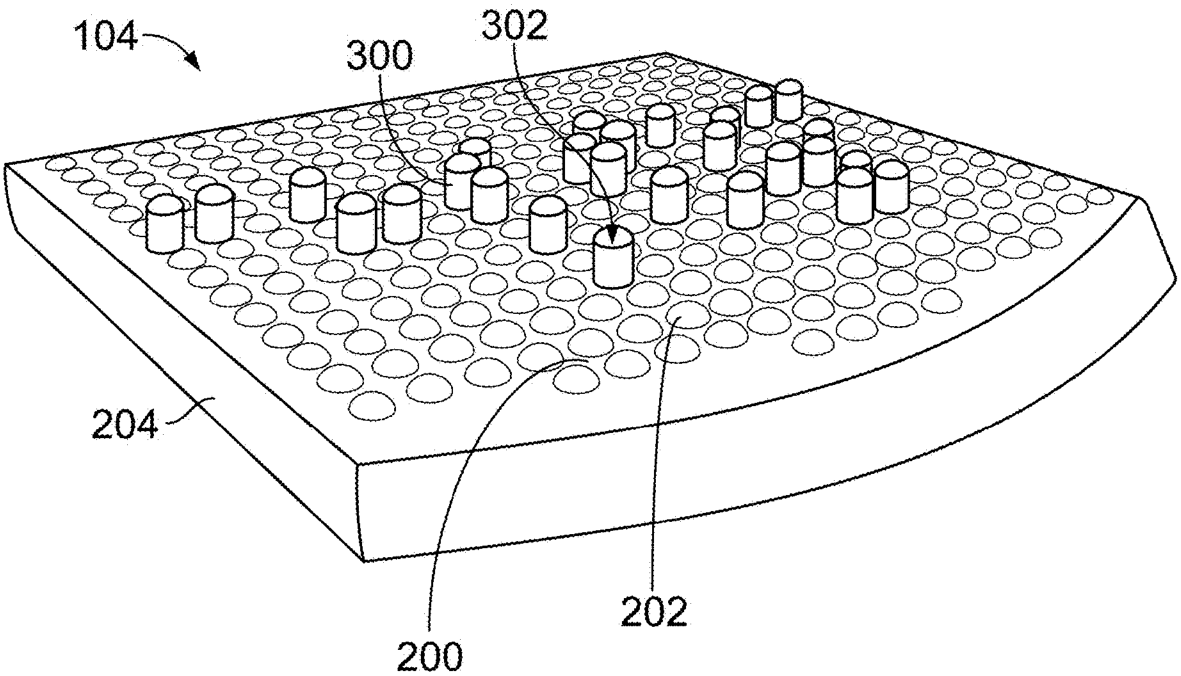
FIG. 4 illustrates another example of the key shown in FIG. 2.

FIG. 1 illustrates one example of a computer 100 with a customizable keyboard 102. The computer 100 is shown as a laptop computer, but optionally may be a desktop computer, a calculator, or another device that can receive input via the keyboard 102. The keyboard 102 can be a QWERTY keyboard, another type of keyboard, a number pad, or the like, having several individual keys 104 that can be pressed to provide input to the computer 100. FIGS. 2 through 4 illustrate examples of one of the keys 104 of the keyboard 102 shown in FIG. 1. The key 104 may have a different shape than is shown. The key 104 has a body 204 forming a shape of the key 104. An upper surface 200 of the body 204 is the part of the body 204 that is contacted and pressed downward by a user to provide input to the computer 100.

The upper surface 200 can be porous in that the upper surface 200 can include one or more openings, holes, or pores 202. The openings 202 are in an array or pattern that may be the same for each key 104 or may differ for different keys 104. The layout or arrangement of the openings 202 can vary from what is shown in FIG. 2. Several pins 300 may be disposed inside the key 104, such as below the upper surface 200 of the key 104. These pins 300 may be aligned with the openings 202 through the upper surface 200 of the key 104. For example, the pins 300 may be elongated cylinders, tubes, cuboids, or the like, which are coaxial with the openings 202.

As shown in FIG. 2, all pins 300 can recess into the key 104 (e.g., the interior of the key 104). The pins 300 have upper surfaces 302 that can be disposed in a different plane than the upper surface 200 of the key 104. For example, when actuated (shown in FIGS. 3 and 4), the pins 300 project upward and out of the openings 202 in the upper surface 200 of the key 104. The upper surfaces 302 of the pins 300 are above the upper surface 200 of the key 104. As a result, a user can feel the upper surfaces 302 of the pins 300 when pressing the key 104 down. The pins 300 can retract into the openings 202 such that the upper surfaces 302 of the pins 300 are flush or coplanar with the upper surface 200 of the key 104. Alternatively, the pins 300 can retract into the openings 202 such that the upper surfaces 302 of the pins 300 are recessed into the openings 202 and are below (e.g., not coplanar with) the upper surface 200 of the key 104.

As shown in FIGS. 3 and 4, different sets of the pins 300 can be actuated to project upward from the upper surface 302 of the key 104 for different keys 104 and/or for the same key 104 but at different times. For example, each key 104 may have a different set or group of the pins 300 project upward from the key 104. This can occur when the pins 300 project upward to form the braille version of the letter, number, symbol, or punctuation that is input by pressing the associated key 104. As another example, two or more keys 104 may have the same group of pins 300 project upward. This can occur when the pins 300 project upward to guide a user to which key 104 to press (or not press). As another example, pins 300 in one or more of the keys 104 may rapidly alternate between recessed and projected positions (e.g., FIG. 2 versus FIGS. 3 and 4) to provide feedback or otherwise tactilely communicate information to the user. This can be used to inform the user when an incorrect key 104 is pressed in a sequence.

The pins 300 in a key 104 can all raise to the same height. For example, while actuated, the upper surfaces 302 of the raised pins 300 may all be coplanar with each other (e.g., in the same plane). Optionally, the pins 300 may raise to different heights above the upper surface 200 of the key 104. For example, some pins 300 may raise to a first height so that the upper surfaces 302 of these pins 300 are coplanar in a first plane, other pins 300 may raise to a greater, second height so that the upper surfaces 302 of these pins 300 are coplanar in a second plane that is farther from the upper surface 200 of the key 104 than the first plane, and so on. Raising the pins 300 to a common plane can provide consistency to a user, while raising pins 300 to different heights can provide different tactile feedback to the user, such as when warning a user about incorrect or correct spelling of words.

Figure 5:
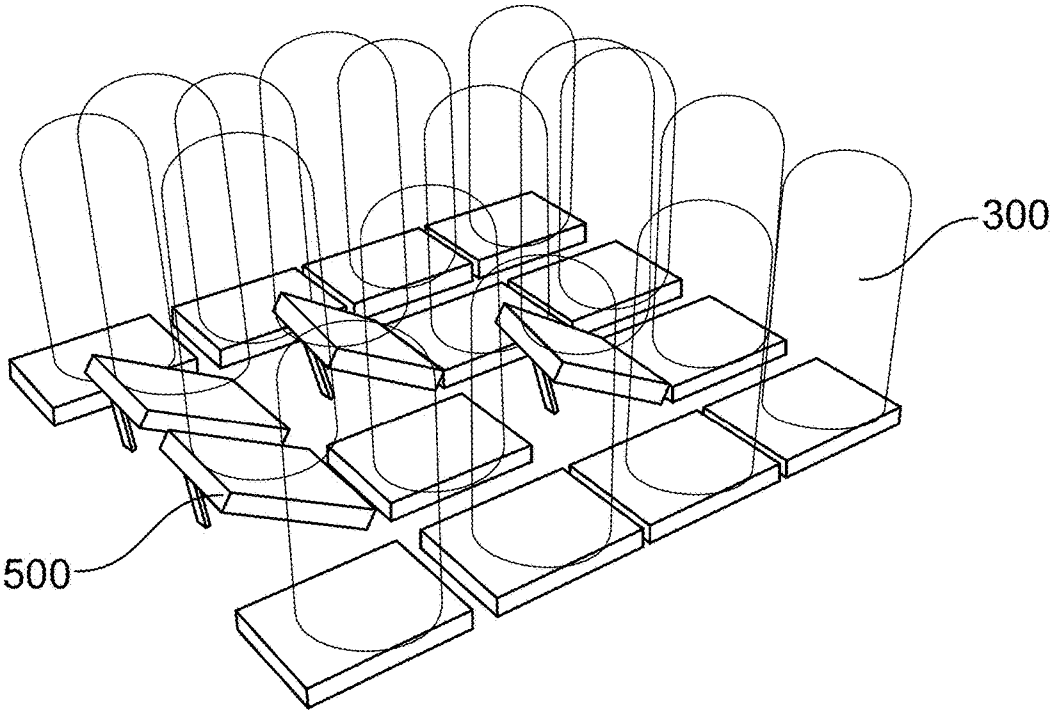
FIG. 5 illustrates one example of several pins within the key shown in FIGS. 2 through 4.

FIG. 5 illustrates one example of several of the pins 300 within a key 104 shown in FIGS. 2 through 4. Each pin 300 may be connected with a different actuator 500. The actuators 500 may operate to move the pins 300 up and down to alternate between projected and recessed positions. The actuators 500 can be pivoting surfaces that pivot upward to push the pins 300 up and pivot downward to pull the pins 300 back down. Or the actuators 500 can be solenoids that are powered to drive the pins 300 up and pull the pins 300 down. As another example, the actuators 500 may be electromagnets that are energized to push the pins 300 up and de-energized to lower the pins 300 (or, energized to pull the pins 300 down and de-energized to push the pins 300 upward). Optionally, the actuators 500 can be springs biased to push the pins 300 upward (or downward).

Figure 6:
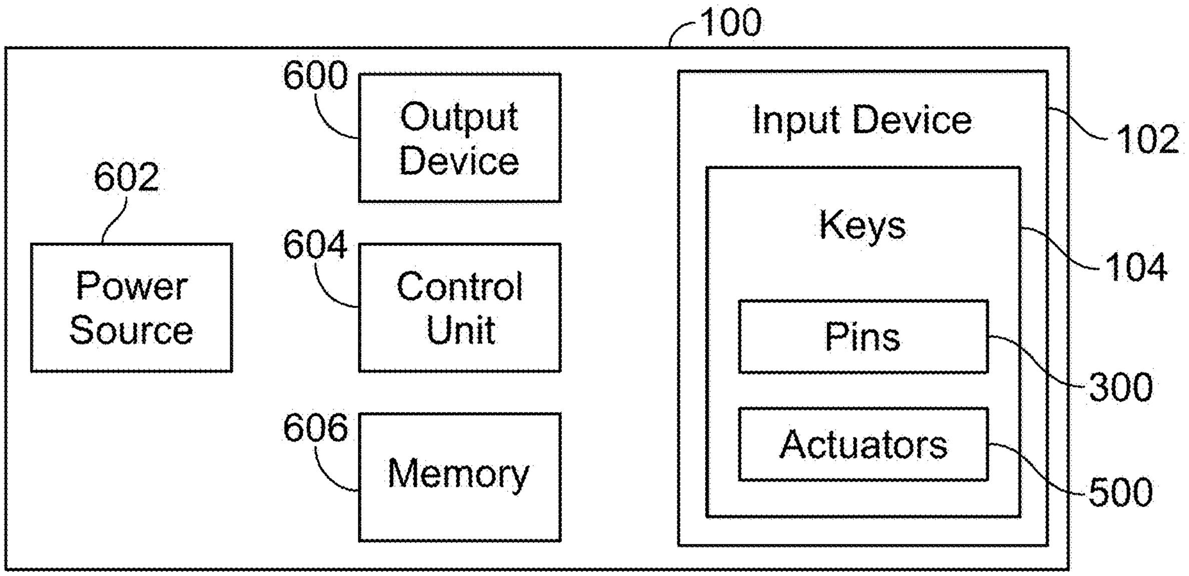
FIG. 6 illustrates another example of the computer shown in FIG. 1.

FIG. 6 illustrates another example of the computer 100 shown in FIG. 1. The computer 100 includes the input device 102 (e.g., the keyboard 102), which includes the keys 104 having the pins 300 and actuators 500 described above. The computer 100 also includes an output device 600, such as an electronic display (e.g., touchscreen or screen that is not touch sensitive) and/or speaker. The computer 100 includes a power source 602, such as an internal and/or external battery, connection to a utility grid, etc. The computer 100 includes a control unit 604, which can represent hardware circuitry that includes and/or is connected with one or more processors (e.g., microprocessor(s), integrated circuit(s), field programmable gate array(s), etc.) that perform the operations described in connection with the control unit 604. The computer 100 can include a tangible and non-transitory computer readable storage medium, such as a computer memory 606 (e.g., computer hard drive).

The control unit 604 can control the actuators 500 for different pins 300 in different keys 104 so that these keys 104 provide different tactile feedback to a user. As described above, the control unit 604 can raise the pins 300 in different keys 104 to form the braille representation of that key 104, to form user-defined symbols or tactile feedback for different keys 104, to form software-defined symbols or tactile feedback, or the like. The control unit 604 can control the actuators 500 of the pins 300 to create braille patterns, to create customized patterns for different keys 104, for setting macro keys 104, etc. The control unit 604 can control the actuators 500 of the pins 300 to train users to type by actuating pins 300 to indicate which key 104 should be pressed next (or should not be pressed next) when typing a word or number and/or to vibrate when the incorrect key 104 is pressed.

In one example, the control unit 604 can learn which words are misspelled more often than other words by individual users, or by several (or all) users. The control unit 604 can track (via the memory 606) which words are misspelled (or mistyped) more than other words or more than a designated threshold frequency, rate, or percentage. These words can be tracked on an individualized basis such that different users have different groups of words that are misspelled more often than other words. For example, one user may misspell (or mistype) the word "vehicle" more often than another user, a user may misspell (or mistype) the word "the" as "teh" more often than another user, and so on. The control unit 604 can build out a misspelled/mistyped word list for each user or for all users. The control unit 604 also can learn when the user tends to type those misspelled words. For example, the control unit 604 can learn, over time, when a user tends to type a commonly mistyped word based on the context of other words or phrases being typed by the user, or using a large language model (LLM) developed for that user.

The control unit 604 can decide that the user is typing or about to type a commonly misspelled word and can control the actuators 500 in the key or keys 104 associated with the correct spelling of the word. For example, the control unit 604 can decide that the user tends to mistype the word "molecular" and decide that the user is typing or beginning to type this word. Instead of (or in addition to) automatically correcting the mistyped word, the control unit 604 can control the actuators 500 (by energizing or de-energizing the actuators 500) connected to the pins 300 to raise the pins 300 for the "m" key 104 until that key 104 is pressed. The pins 300 that are raised may be all pins 300 in that key 104, or some (but not all) of the pins 300. The pins 300 in other keys 104 may not be raised. Alternatively, the pins 300 may be raised in all keys 104 but the "m" key 104.

Once the "m" key 104 is pressed, the control unit 604 can control the actuators 500 connected to the pins 300 in the "m" key 104 to lower the raised pins 300. The control unit 604 can concurrently or subsequently control the actuators 500 connected to the pins 300 in the "o" key 104 to raise some or all of the pins 300. The other pins 300 in other keys 104 may not be raised (or the pins 300 in the "o" key 104 may remain recessed while the pins 300 in other keys 104 are raised). Once the "m" key 104 is pressed, the control unit 604 can control the actuators 500 connected to the pins 300 in the "m" key 104 to lower the raised pins 300, and so on. In this way, the control unit 604 can raise and lower pins 300 in different keys 104 to tactilely guide the user along in the correct spelling of a commonly misspelled word.

The control unit 604 can raise or lower pins 300 to warn a user when an incorrect key 104 is pressed. For example, during typing, if the user presses or begins to press the key 104 that would result in a misspelling of a word, the control unit 604 can raise the pins 300 in the incorrect key 104, raise the pins 300 higher than normal or otherwise (e.g., than when directing the user on which key 104 to press), and/or oscillate pins 300 up and down repeatedly to warn the user of the misspelling.

Figure 7:
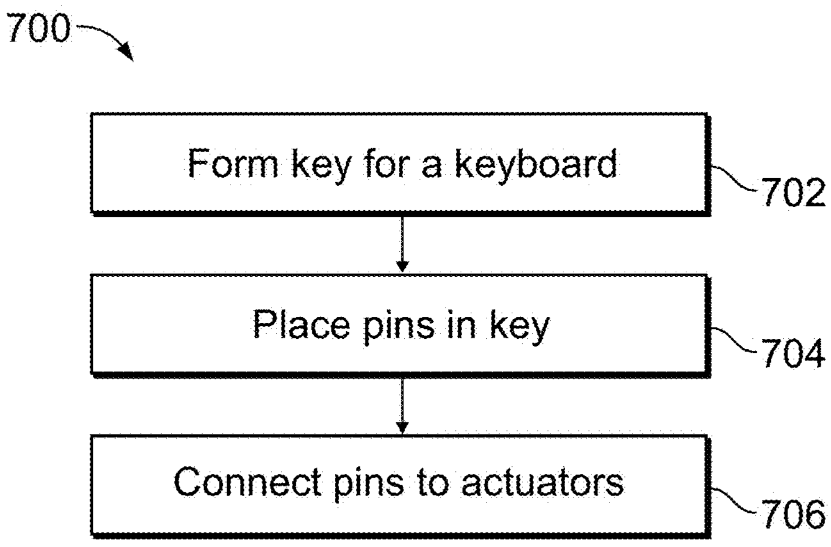
FIG. 7 illustrates a flowchart of one example of a method for providing a keyboard with individually customizable keys.

FIG. 7 illustrates a flowchart of one example of a method 700 for providing a keyboard with individually customizable keys. The method 700 can represent how the keyboard 102 described above would be created. At 702, a key for a keyboard is formed. The key may be formed with an upper surface having several openings for pins to project out. At 704, pins are placed in the openings of the key. At 704, lower ends of the pins can be connected with actuators. These actuators may be controlled to raise the pins to project out of the upper surface of the key through the openings in the key and/or to lower the pins to no longer project out of the upper surface of the key. The actuators may be coupled with a control unit of a computer to control the actuators and, thereby, the pins.

In one example, a key configured to be included in a keyboard is provided. The key includes a body having an upper surface that is contacted to provide input to a computer. The upper surface of the body has one or more openings. The key also includes one or more pins positioned in the body and aligned with the one or more openings, and one or more actuators coupled with the one or more pins. The one or more actuators configured to move the one or more pins to move through the one or more openings and project out from the upper surface of the body.

The one or more openings in the body can be two or more openings, the one or more pins can be two or more pins, and the one or more actuators can be two or more actuators. The two or more pins and the two or more openings in the body can create a braille pattern of a letter, number, symbol, or punctuation associated with the key. The two or more actuators can raise the two or more pins different heights above the upper surface of the body.

The one or more actuators can raise the one or more pins out of the upper surface of the body responsive to a word being misspelled using the key. The one or more actuators can raise the one or more pins out of the upper surface of the body during training of a user. Each of the one or more actuators can raise a corresponding pin of the one or more pins to different heights above the upper surface of the body. The one or more actuators can include one or more of a solenoid, a magnet, or a spring.

In one example, a method includes forming a body of a key of a keyboard. The body can be formed to have an upper surface that is contacted to provide input to a computer. The upper surface of the body can be formed to include one or more openings. The method also can include placing one or more pins in the body and aligned with the one or more openings, and coupling one or more actuators with the one or more pins. The one or more actuators can move the one or more pins to move through the one or more openings and project out from the upper surface of the body.

The body can be formed to include two or more of the openings, two or more of the pins can be placed into the body, and two or more of the actuators can be coupled with the two or more pins. The body can be formed with the two or more openings in an arrangement to create a braille pattern of a letter, number, symbol, or punctuation associated with the key using the two or more pins. The two or more actuators can be coupled with the two or more pins to raise the two or more pins different heights above the upper surface of the body. Each of the one or more actuators can be coupled with a corresponding pin of the one or more pins to raise the pin different heights above the upper surface of the body.

In another example, a computer can include a keyboard having plural keys configured to be pressed to provide input, and a control unit configured to receive the input from pressing of the keys in the keyboard. The one or more of the keys in the keyboard have an upper surface with one or more holes through the upper surface and one or more pins located inside the one or more of the keys. The one or more of the keys can include one or more actuators coupled with the one or more pins. The control unit can control the one or more actuators to raise the one or more pins out of the one or more openings and project upward and outward from the upper surface of the one or more keys.

The one or more keys can include two or more of the openings, two or more of the pins, and two or more of the actuators. The control unit can individually control each of the two or more actuators to individually raise or lower each of the two or more pins. The control unit can control the one or more actuators to form braille patterns above the upper surface of the one or more keys. The control unit can control the one or more actuators to generate tactile feedback indicating incorrect pressing of the one or more of the keys.

The control unit can control the one or more actuators to oscillate the one or more pins out of and back into the one or more openings to guide pressing or not pressing of the one or more keys. The control unit can control the one or more actuators to guide a user to press the one or more keys. The control unit can control the one or more actuators to guide the user to press the one or more keys in a correct spelling of a word.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. The various embodiments are not limited to the arrangements and instrumentality shown in the drawings.

Since certain changes may be made in the above-described systems and methods without departing from the spirit and scope of the inventive subject matter herein involved, it is intended that all the subject matter of the above description or shown in the accompanying drawings shall be interpreted merely as examples illustrating the inventive concept herein and shall not be construed as limiting the inventive subject matter.

What is claimed is:

1. A key configured to be included in a keyboard, the key including:

a body having an upper surface that is contacted to provide input to a computer, the upper surface of the body having one or more openings;

one or more pins positioned in the body and aligned with the one or more openings;

one or more actuators coupled with the one or more pins, the one or more actuators configured to move the one or more pins to move through the one or more openings and project out from the upper surface of the body and to oscillate the one or more pins between a projected position and a recessed position to provide vibratory tactile feedback; and a control unit configured to track, via a memory, which words are mistyped more than other words by an individual user; decide that the individual user is typing a more often misspelled word based on a context of other words or phrases being typed by the individual user; control the one or more actuators to oscillate the one or more pins in only a next key of the keyboard associated with a correct spelling of the more often misspelled word to indicate when the next key is to be pressed; and responsive to deciding that the individual user pressed a wrong key of keys in a sequence of the keys associated with the correct spelling of the more often misspelled word, control the one or more actuators to raise the one or more pins in the wrong key higher than while directing the individual user on which key is to be pressed and to oscillate the one or more pins in the wrong key up and down repeatedly to warn the individual user of a misspelling.

2. The key of claim 1, wherein the one or more openings in the body is two or more openings, the one or more pins is two or more pins, and the one or more actuators is two or more actuators.

3. The key of claim 2, wherein the two or more pins and the two or more openings in the body are arranged to create a braille pattern of a letter, number, symbol, or punctuation associated with the key.

4. The key of claim 2, wherein the two or more actuators are configured to raise the two or more pins different heights above the upper surface of the body.

5. The key of claim 1, wherein the one or more actuators is configured to raise the one or more pins higher than while directing the individual user on which key is to be pressed and to oscillate the one or more pins up and down repeatedly responsive to a word being misspelled using the key.

6. The key of claim 1, wherein the one or more actuators is configured to oscillate the one or more pins between the projected position and the recessed position to indicate when the key is to be pressed next while typing a word during training of the individual user.

7. The key of claim 1, wherein each of the one or more actuators is configured to raise a corresponding pin of the one or more pins to different heights above the upper surface of the body.

8. The key of claim 1, wherein the one or more actuators includes one or more of a solenoid, a magnet, or a spring.

9. A method comprising:

forming a body of a key of a keyboard, the body formed to have an upper surface that is contacted to provide input to a computer, the upper surface of the body formed to include one or more openings;

placing one or more pins in the body and aligned with the one or more openings;

coupling one or more actuators with the one or more pins, the one or more actuators configured to oscillate the one or more pins between a projected position out of the upper surface of the body and a recessed position inside the body to provide vibratory tactile feedback;

tracking, using a control unit and a memory, which words are mistyped more often than other words by an individual user;

deciding, using the control unit, that the individual user is typing or about to type a commonly misspelled word based on a context of other words or phrases being typed by the individual user;

controlling the one or more actuators to oscillate the one or more pins in only a next key of the keyboard associated with a correct spelling of the commonly misspelled word to indicate when the next key is to be pressed; and responsive to deciding that the individual user pressed a wrong key of keys in a sequence of the keys associated with the correct spelling of the commonly misspelled word, controlling the one or more actuators to raise the one or more pins in the wrong key higher than when directing the individual user on which key is to be pressed and to oscillate the one or more pins in the wrong key up and down repeatedly to warn the individual user of a misspelling.

10. The method of claim 9, wherein the body is formed to include two or more of the openings, two or more of the pins are placed into the body, and two or more of the actuators are coupled with the two or more pins.

11. The method of claim 10, wherein the body is formed with the two or more openings in an arrangement to create a braille pattern of a letter, number, symbol, or punctuation associated with the key using the two or more pins.

12. The method of claim 10, wherein the two or more actuators are coupled with the two or more pins to raise the two or more pins different heights above the upper surface of the body.

13. The method of claim 9, wherein each of the one or more actuators is coupled with a corresponding pin of the one or more pins to raise the pin different heights above the upper surface of the body.

14. A computer comprising:

a keyboard having plural keys configured to be pressed to provide input; and a control unit configured to receive the input from pressing of the keys in the keyboard, wherein one or more of the keys in the keyboard having an upper surface with one or more openings through the upper surface and one or more pins located inside the one or more of the keys, the one or more of the keys including one or more actuators coupled with the one or more pins, the control unit configured to control the one or more actuators to raise the one or more pins out of the one or more openings and project upward and outward from the upper surface of the one or more keys, and wherein the control unit is configured to track, via a memory, which words are mistyped more than other words by an individual user; decide that the individual user is typing or about to type a commonly misspelled word based on a context of other words or phrases being typed by the individual user; control the one or more actuators to oscillate the one or more pins out of and back into the one or more openings in only a next key of the keys associated with a correct spelling of the commonly misspelled word to indicate when the next key is to be pressed; and responsive to deciding that the individual user pressed a wrong key of keys in a sequence of the keys associated with the correct spelling of the commonly misspelled word, control the one or more actuators to raise the one or more pins in the wrong key higher than when directing the individual user on which key is to be pressed and to oscillate the one or more pins in the wrong key up and down repeatedly to warn the individual user of a misspelling.

15. The computer of claim 14, wherein the one or more keys include two or more of the openings, two or more of the pins, and two or more of the actuators, the control unit configured to individually control each of the two or more actuators to individually raise or lower each of the two or more pins.

16. The computer of claim 14, wherein the control unit is configured to control the one or more actuators to form braille patterns above the upper surface of the one or more keys.

17. The computer of claim 14, wherein the control unit is configured to control the one or more actuators to guide the user to press the one or more keys in the sequence for the correct spelling of the word by oscillating the one or more pins between a projected position and a recessed position.

18. The computer of claim 14, wherein the control unit is configured to monitor a sequence of the keys being pressed by the user in entry of a word and to control the one or more actuators to raise the one or more pins in a wrong key higher than when directing the individual user on which key is to be pressed and to oscillate the one or more pins in the wrong key up and down repeatedly responsive to deciding that the user pressed the wrong key of the keys in the sequence of the keys associated with the correct spelling of the word.

19. The computer of claim 14, wherein the control unit is configured to control the one or more actuators to oscillate the one or more pins out of and back into the one or more openings to indicate the next key of the keys to be pressed in entry of the sequence of the keys for the correct spelling of the word.

20. The computer of claim 19, wherein the control unit is configured to control the one or more actuators to lower the one or more pins into the one or more openings responsive to the user pressing the next key of the keys to be pressed in entry of the sequence of the keys for the correct spelling of the word.

* * * * *